No. 642,453. Patented Jan. 30, 1900.
W. F. HUNT.
CREAM SEPARATOR.
(Application filed Dec. 5, 1899.)
(No Model.) 2 Sheets—Sheet 1.

WITNESSES:

INVENTOR
William F. Hunt
BY
Smith & Denison
ATTORNEYS.

No. 642,453. Patented Jan. 30, 1900.
W. F. HUNT.
CREAM SEPARATOR.
(Application filed Dec. 5, 1899.)
(No Model.) 2 Sheets—Sheet 2.

WITNESSES:
C. C. Schoeneck
M. M. Nott.

INVENTOR
William F. Hunt
BY
Smith & Denison
ATTORNEYS.

UNITED STATES PATENT OFFICE.

WILLIAM F. HUNT, OF NEWARK, NEW YORK, ASSIGNOR OF ONE-HALF TO HENRY S. HUNT, OF SAME PLACE.

CREAM-SEPARATOR.

SPECIFICATION forming part of Letters Patent No. 642,453, dated January 30, 1900.

Application filed December 5, 1899. Serial No. 739,233. (No model.)

*To all whom it may concern:*

Be it known that I, WILLIAM F. HUNT, of Newark, in the county of Wayne, in the State of New York, have invented new and useful Improvements in Cream-Separators, of which the following, taken in connection with the accompanying drawings, is a full, clear, and exact description.

This invention relates to improvements in cream-separators, having more particular reference to the construction of the cover and upper portion of the can by which the milk is aerated as a condition precedent to the cream being separated from the milk.

My object is to produce a cream-separator which is cheap and durable in its construction, of great utility, and effective in its operation, and at the same time separate the cream from the milk in the shortest time possible.

It is a well-known fact that by mixing milk with cold water accelerates the separation of the cream from the milk, and I have found that by thoroughly aerating the milk, so as to eliminate to a large degree the animal heat before it comes in contact with the cold water, greatly assists in separating the cream; and to that end my invention consists of the several new and novel features of construction and operation which are specifically set forth in the claims hereunto annexed.

It is constructed as follows, reference being had to the accompanying drawings, in which—

Figure 1:
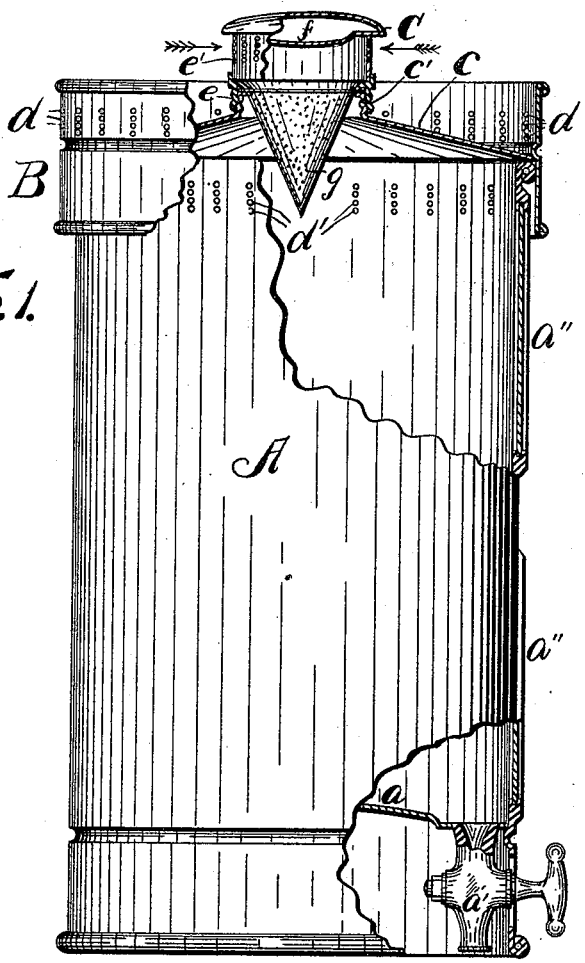
Figure 2:
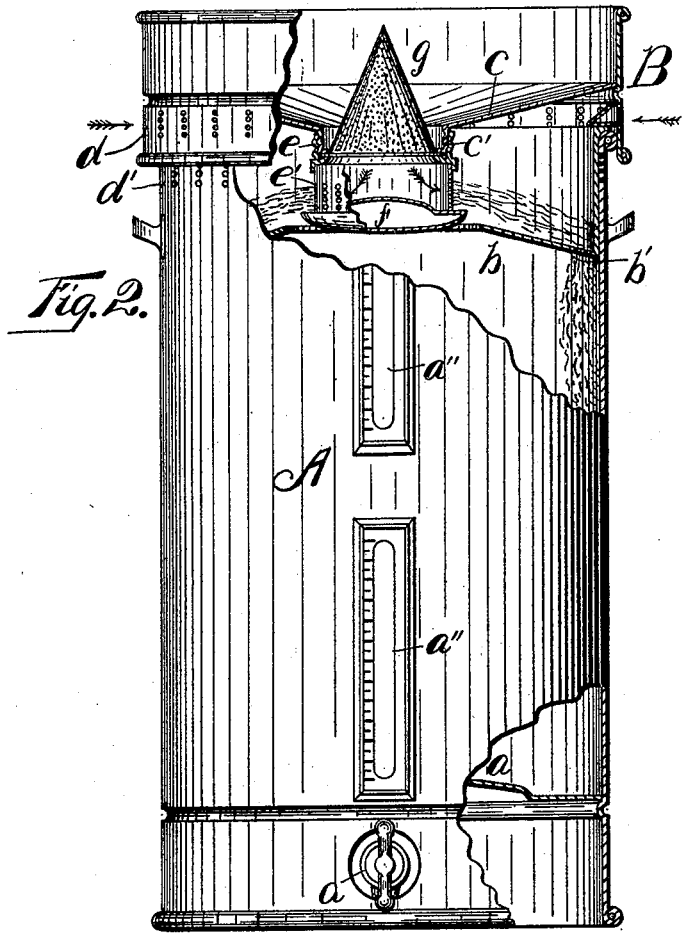
Figure 3:
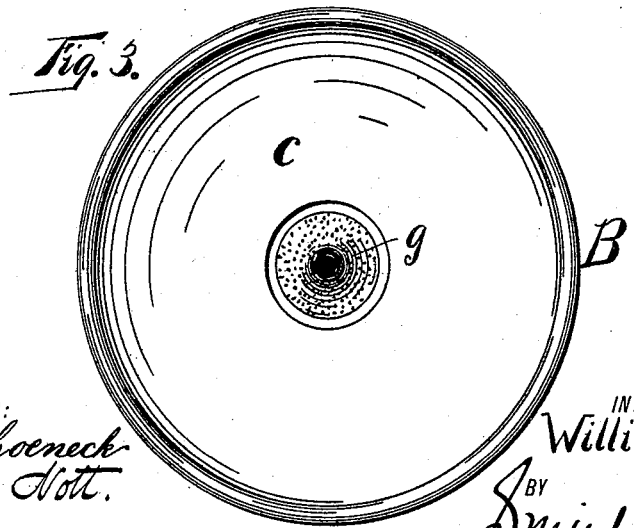

Figure 1 is a side view of the cream-separator with the top reversed, showing its position when not in use, so as to exclude dirt from the can, the shell being partly broken away, showing the interior. Fig. 2 is a front view of the separator, showing the top reversed and in the position it occupies when the milk is passing through it to be aerated and just before passing to the bottom to be united with the cold water. Fig. 3 is a top plan view thereof.

Similar letters of reference indicate corresponding parts.

A is the can, constructed in any ordinary way and provided with a bottom $a$, which inclines from the center toward the faucet $a'$, by which the contents of the can is drawn off. The can is also provided with a side gage $a''$, and adjacent its top is an outwardly-inclined annular shelf $b$, having in its outer edges and adjacent the wall of the can perforations $b'$.

The top B is constructed substantially as shown, having a central shelf $c$ inclined inwardly and terminating in a threaded flange $c'$, as shown in Figs. 1 and 2, and $d$ are perforations in the top for the purposes hereinafter specified.

C is a cap having a threaded flange $e$, adapted to engage with the threaded flange $c'$, and is also provided with openings $e'$ and a deflecting bottom $f$, and $g$ is a removable strainer, either metallic or otherwise and constructed flat, cone-shaped, or semicircular, as desired.

My invention is operated as follows: Assuming the separator is in the position shown in Fig. 1, I then remove the top and place in the can cold water equal to the amount of milk to be separated. I then reverse the top and place it on top of the can, as shown in Fig. 2, and pour in the milk, allowing it to pass through the strainer $g$. Thence it passes down into the cap C, and as it strikes the bottom $f$ it is forced laterally through the perforations $e'$, and thence passes onto the shelf $b$ and down through the perforations $b'$, where it mixes with the cold water in the bottom of the can. By passing the milk through the strainer and thence through the various perforations in the cap and in the shell it is thoroughly aerated and most of the animal heat taken out, and then as it mixes with the cold water in the bottom of the can separation immediately begins. As the milk passes down onto the can it will be observed that the air is forced out through the perforations $d$ and $d'$ in the top and upper part of the can.

During the process of separation I reverse the top and place it on top of the can, as shown in Fig. 1, allowing the perforations $d$ and $e'$ to act as a vent.

Having described my invention, what I claim, and desire to secure by Letters Patent, is—

1. A cream-separator comprising a receptacle having a perforated shelf in its upper end, and a top having an inclined bottom, a cap secured thereto, provided with a strainer and a deflecting-plate, for the purpose of aerating the milk, as it passes through the can.

2. In a cream-separator, a receptacle having a perforated shelf in its upper part inclined outwardly, a top having an inclined bottom terminating in a flange, a cap adapted to be secured to said flange, and having its walls perforated, and a strainer at one end, and a deflecting-plate in the other for the purpose of aerating the milk as it passes into the can, as set forth.

In witness whereof I have hereunto set my hand this 22d day of November, 1899.

WILLIAM F. HUNT.

Witnesses:
MILDRED M. NOTT,
HOWARD P. DENISON.